(12) United States Patent
Sharpe

(10) Patent No.: US 7,812,950 B2
(45) Date of Patent: Oct. 12, 2010

(54) SYSTEM METHOD AND APPARATUS FOR OPTICAL DIRECTIONAL DETERMINATION

(75) Inventor: John P. Sharpe, Los Osos, CA (US)

(73) Assignee: California Polytechnic State University Corporation, San Luis Obispo, CA (US)

( * ) Notice: Subject to any disclaimer, the term of this patent is extended or adjusted under 35 U.S.C. 154(b) by 418 days.

(21) Appl. No.: 12/062,492

(22) Filed: Apr. 3, 2008

(65) Prior Publication Data

US 2009/0002705 A1    Jan. 1, 2009

Related U.S. Application Data

(60) Provisional application No. 60/947,371, filed on Jun. 29, 2007.

(51) Int. Cl.
 *G01N 21/00* (2006.01)
(52) U.S. Cl. ...................................... 356/338; 356/337
(58) Field of Classification Search ......... 356/337–338, 356/485–486, 492–493, 496–498, 27–28.5, 356/227, 35.5; 250/237 G; 359/326; 385/15–16
See application file for complete search history.

(56) References Cited

U.S. PATENT DOCUMENTS 5,194,745 A * 3/1993 Takamiya et al. ...... 250/559.31

\* cited by examiner

*Primary Examiner*—Gregory J Toatley, Jr.
*Assistant Examiner*—Tri T Ton
(74) *Attorney, Agent, or Firm*—Martine Penilla & Gencarella, LLP

(57) ABSTRACT

A method for measuring the direction and velocity of a target in a measurement volume in a laser Doppler velocimetry system includes selecting a discrete number of grating positions for an electrically switchable grating, placing the electrically switchable grating in a light path of a laser source. The laser source outputs a laser beam along the light path. The method further includes switching the electrically switchable grating sequentially through the discrete number of grating positions at a grating frequency to generate diffracted light beams from the laser, directing the diffracted light beams through a lens, focusing the diffracted light beams on a measurement volume, passing a target through the measurement volume in a target direction at a target velocity and receiving scattered light in a detector and calculating the power spectrum of light intensity fluctuations. The power spectrum includes a maximum peak. The maximum peak occurs at a frequency shifted from the grating frequency an amount corresponding to the target velocity and in a direction corresponding to the target direction. A laser Doppler velocimetry system for measuring the direction and velocity of a target in a measurement volume is also disclosed.

21 Claims, 9 Drawing Sheets

$t = 0$ $t = (2/3)\pi$ $t = (4/3)\pi$

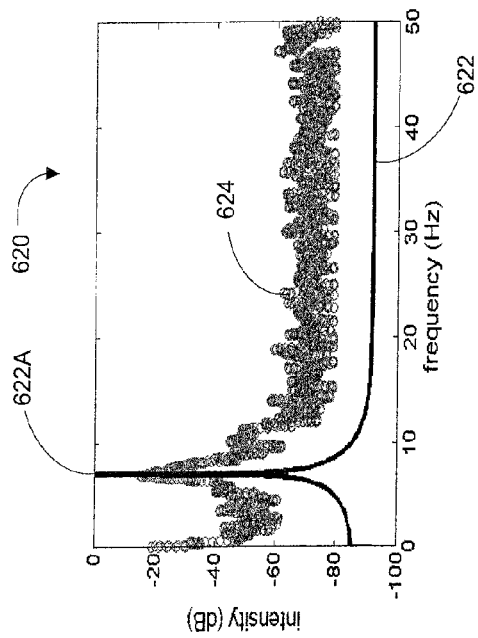
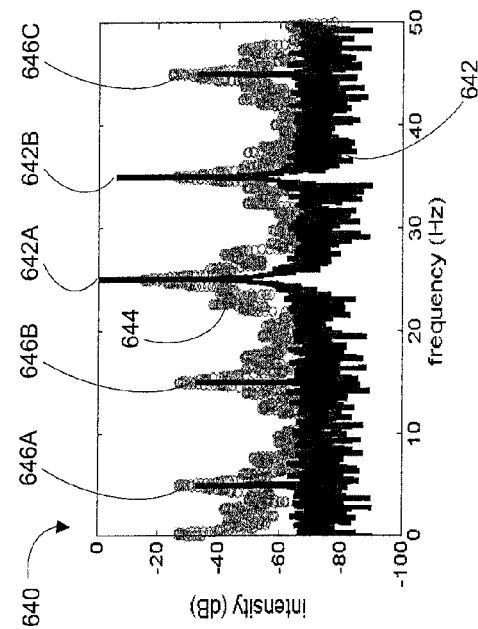
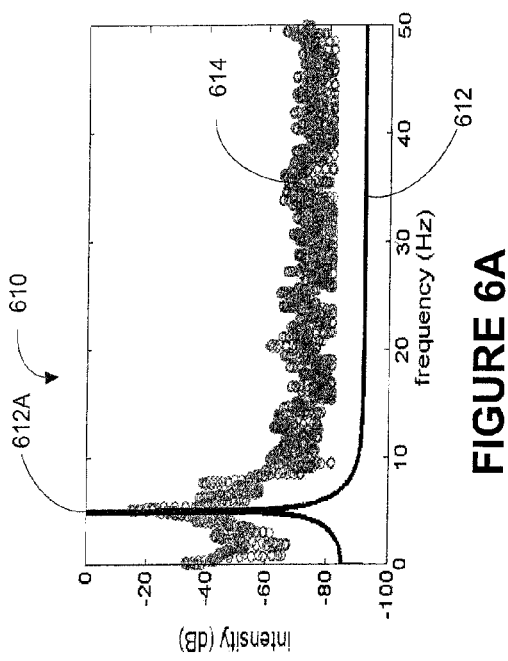
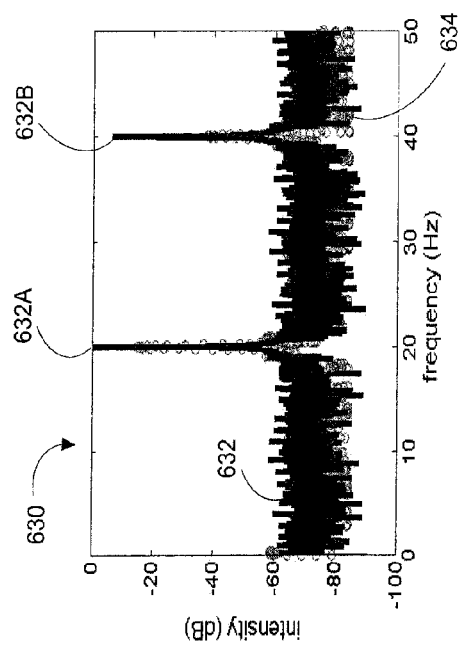
FIGURE 6A
FIGURE 6B
FIGURE 6C
FIGURE 6D

SYSTEM METHOD AND APPARATUS FOR OPTICAL DIRECTIONAL DETERMINATION

This application claims priority from U.S. Provisional Patent Application No. 60/947,371 filed on Jun. 29, 2007 and entitled "SYSTEM METHOD AND APPARATUS FOR A PHASE-STEPPED GRATING FOR DOPPLER VELOCIMETRY," which is incorporated herein by reference in its entirety.

BACKGROUND

The present invention relates generally to systems and methods for measuring velocity, and more particularly, to methods and systems for Doppler velocimetry providing directional vectors.

Laser Doppler velocimetry (LDV) has been in development for several decades and provides one of the best methods for high-accuracy, single-point, fluid or surface velocity measurement. However, typical LDV systems and methods cannot easily determine a direction of the fluid flow. This has been addressed in various ways. By way of example, a Bragg cell can be used in a two-beam laser system to create a frequency shift between the laser beams.

One of the earliest methods of making the LDV system direction-sensitive used a mechanically rotating diffraction grating in the optical path. FIG. 1 is a schematic of a typical LDV system 100 with a mechanically rotating diffraction grating 106. Typically, the rotating diffraction grating 106 is produced by mounting the grating radially on a small wheel mounted coupled to a motor 108. The motor 108 then rotates the grating continuously.

A laser source 102 emits a laser beam 104 along a light path 105 toward the mechanically rotating diffraction grating 106. The mechanically rotating diffraction grating 106 diffracts the laser beam 104 into two laser beams 104A and 104B. It should be noted that for clarity purposes only the +/−first diffraction order laser beams 104A and 104B are shown in FIG. 1 and that higher diffraction order laser beams (not shown) can also be produced.

The mechanically rotating diffraction grating 106 is typically moved by a motor 108. The mechanically rotating diffraction grating 106 moves transverse to the laser beam 104 with a velocity v so that the first order diffracted laser beams 104A and 104B are shifted up and down in frequency, respectively. The diffracted laser beams 104A and 104B are then incident on an input surface 110A of the lens 110. The lens 110 focuses diffracted laser beams 104A and 104B. The lens 110 emits the focused diffracted laser beams 104A' and 104B' from an output surface 110B toward a measurement volume 112. Where the focused, diffracted laser beams 104A' and 104B' cross is the measurement volume 112. Interference fringes are formed in the measurement volume 112. Due to the motion of the diffraction grating 106, the fringes 112A-112D in the measurement volume move in the y direction with a frequency 2v/d.

The diffraction grating 106 performs two roles in the above system 100. First, rotating the diffraction grating 106 splits the input laser beam 104 into two laser beams 104A and 104B. If a sinusoidal phase diffraction grating 106 is used, only two laser beams 104A and 104B may be generated. If a non-sinusoidal diffraction grating is used all but the +/−1 first diffraction order laser beams are blocked.

Secondly, mechanically moving the diffraction grating 106 induces a frequency shift onto the two diffracted laser beams 104A and 104B. One diffracted laser beam 104A shifts up in frequency and the other diffraction order laser beam 104B shifts down in frequency. This frequency shift causes the fringes to move.

The two, focused diffracted, laser beams 104A' and 104B' recombine in the measurement volume 112. When a particle 120 is stationary in the measurement volume there is a fluctuation of the scattered light intensity as the interference fringes move past the particle. The frequency of these fluctuations is 2v/d. Light is reflected from the particle in all directions (i.e., scattered).

When the particle moves it will either move in a direction opposite of the moving fringes (i.e., forward) or in the same direction as the moving fringes (i.e., reverse). When the particle moves forward, the measured frequency of the intensity fluctuations is more than 2v/d. When the particle moves in reverse, the measured frequency of the intensity fluctuations will be less than 2v/d. This increase or decrease of the frequency allows the direction of motion to be determined.

The mechanical rotating grating system 100 of frequency shifting works and is commercially available. The mechanical rotating grating system 100 has several shortcomings. One shortcoming is a spatially varying fringe 112A-112B period in the measurement volume.

In another shortcoming, the motor 108 induces vibration into the mechanically moving grating 106. This vibration causes additional intensity fluctuations.

In view of the foregoing, there is a need for an improved LDV system capable of determining direction and yet without needing a rotating grating.

SUMMARY

Broadly speaking, the present invention fills these needs by providing an improved LDV system capable of determining direction using an electronically switchable grating. It should be appreciated that the present invention can be implemented in numerous ways, including as a process, an apparatus, a system, computer readable media, or a device. Several inventive embodiments of the present invention are described below.

One embodiment provides a method for measuring the direction and velocity of a target in a measurement volume in a laser Doppler velocimetry system includes selecting a discrete number of grating positions for an electrically switchable grating, placing the electrically switchable grating in a light path of a laser source. The laser source outputs a laser beam along the light path. The method further includes switching the electrically switchable grating sequentially through the discrete number of grating positions at a grating frequency to generate diffracted light beams from the laser, directing the diffracted light beams through a lens, focusing the diffracted light beams on a measurement volume, passing a target through the measurement volume in a target direction at a target velocity and receiving scattered light in a detector and calculating the power spectrum of light intensity fluctuations. The power spectrum includes a maximum peak. The maximum peak occurs at a frequency shifted from the grating frequency an amount corresponding to the target velocity and in a direction corresponding to the target direction.

The discrete number of grating positions can include three positions. The discrete number of grating positions can include more than three positions. The discrete number of grating positions can be equally spaced along a $2\pi$ radian cycle.

The discrete number of grating positions can be electronically displayed images. The electrically switchable grating can be an electronic image displayed on an electronic display and the discrete number of grating positions can include a discrete number of electronic grating images. The electronic display can be a liquid crystal display. The electronic display can be a digital micro-mirror display.

The maximum peak can occur at a frequency less than the grating frequency if the target is moving in a reverse direction. The maximum peak can occur at a frequency greater than the grating frequency if the target is moving in a forward direction. The grating frequency can be between less than about one Hertz and more than about 100 MHz. The target can include at least one of a fluid flow and a surface and the target is moving relative to the measurement volume.

Another embodiment provides a laser Doppler velocimetry system for measuring the direction and velocity of a target in a measurement volume. The system includes a lens, a laser source, electrically switchable grating, a moving target, a detector and a controller. The laser source outputs a laser beam along a light path and the light path is directed toward the lens. The electrically switchable grating includes a discrete number of grating positions and the electrically switchable grating is in the light path between the laser source and the lens. The moving target passes through a measurement volume in a target direction and at a target velocity. The lens focuses a pair of diffracted light beams from the electrically switchable grating into the measurement volume. The detector is directed along the light path. The detector is on an opposite side of the lens from the laser source. The controller is coupled to the electrically switchable grating and the detector. The controller includes circuitry for determining a maximum peak in the power spectrum of a signal received in the detector. The maximum peak occurs at a frequency shifted from the grating frequency an amount corresponding to the target velocity and in a direction corresponding to the target direction.

The discrete number of grating positions can include three positions. The discrete number of grating positions can include more than three positions. The discrete number of grating positions can be equally spaced along a $2\pi$ radian cycle.

The electrically switchable grating is an electronic image displayed on an electronic display and wherein the discrete number of grating positions include a discrete number of electronic grating images. The electronic display can be a liquid crystal display. The electronic display can be digital micro-mirror display.

The maximum peak can occur at a frequency less than the grating frequency if the target is moving in a reverse direction. The maximum peak can occur at a frequency greater than the grating frequency if the target is moving in a forward direction.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

FIGS. 6A through 6E are graphical representations of power spectra of light intensity fluctuations of an actual test of the performance of the LDV system, in accordance with one or more embodiments of the present invention.

DETAILED DESCRIPTION

Several exemplary embodiments for an improved LDV system capable of determining direction using an electronically switchable grating will now be described. It will be apparent to those skilled in the art that the present invention may be practiced without some or all of the specific details set forth herein.

One embodiment provides a system and method for electronically switching the diffraction grating. Determining direction does not require a continuous change in phase position of the diffraction grating but rather the phase need only shift or switch between predefined phase shifts within a single the 0 to $2\pi$ radians cycle. Further, only three or more discrete steps or shifts are needed within the 0 to $2\pi$ radian interval.

As described above, a moving diffraction grating imposing frequency shifts on the +/−first diffraction order laser beams in order to give moving fringes is the same as projecting a (spatially filtered) image of the moving grating into the flow of particles.

The grating can be shifted so that one period of the projected fringe pattern is covered in a single complete cycle of the image of the grating. The cycle can be repeated for as many repetitions as desired. One approach to switching the position of the diffraction grating is to physically move the grating into the desired discrete positions. In another approach the diffraction grating can be an image on a display (e.g., liquid crystal, MEMS device, etc.) and the image can be electronically switched into the desired number of different discrete positions in the display. The display position can be physically moved and the image position displayed therein can also be electronically switched in the display. The present invention can be used to detect movement and determine direction of movement of a target in the measurement volume. The target can be one or more particles in a gaseous or liquid (i.e., fluid) stream moving relative to the measurement volume. The target can be a surface that is moving relative to the measurement volume. By way of example, a surface moving under an optical computer mouse and the invention is included in the computer mouse to detect motion and direction of the mouse relative to the surface.

Figure 1:
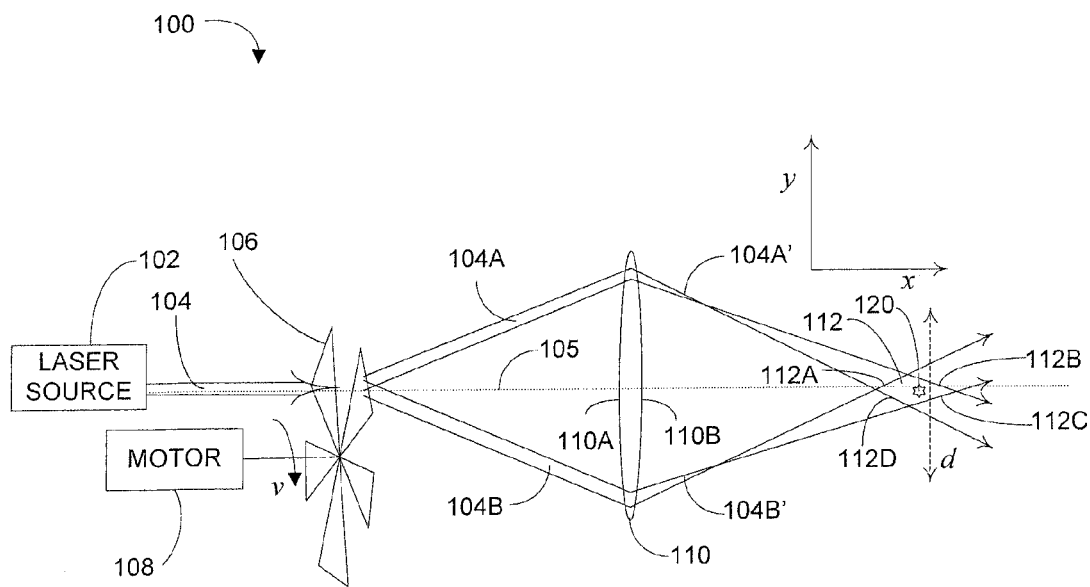
FIG. 1 is a schematic of a typical LDV system with a mechanically moving diffraction grating.
Figure 2:
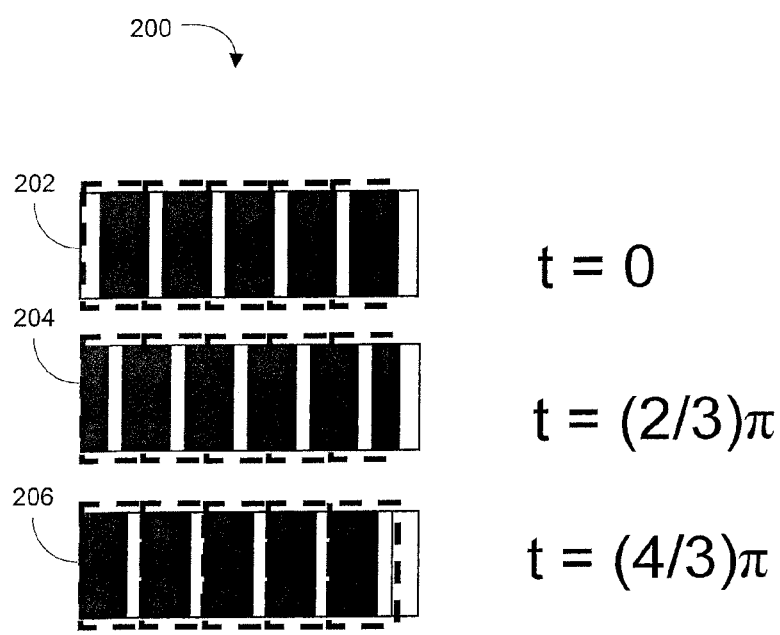
FIG. 2 is a diagram of an electronically switchable grating, in accordance with an embodiment of the present invention.
Figure 3:
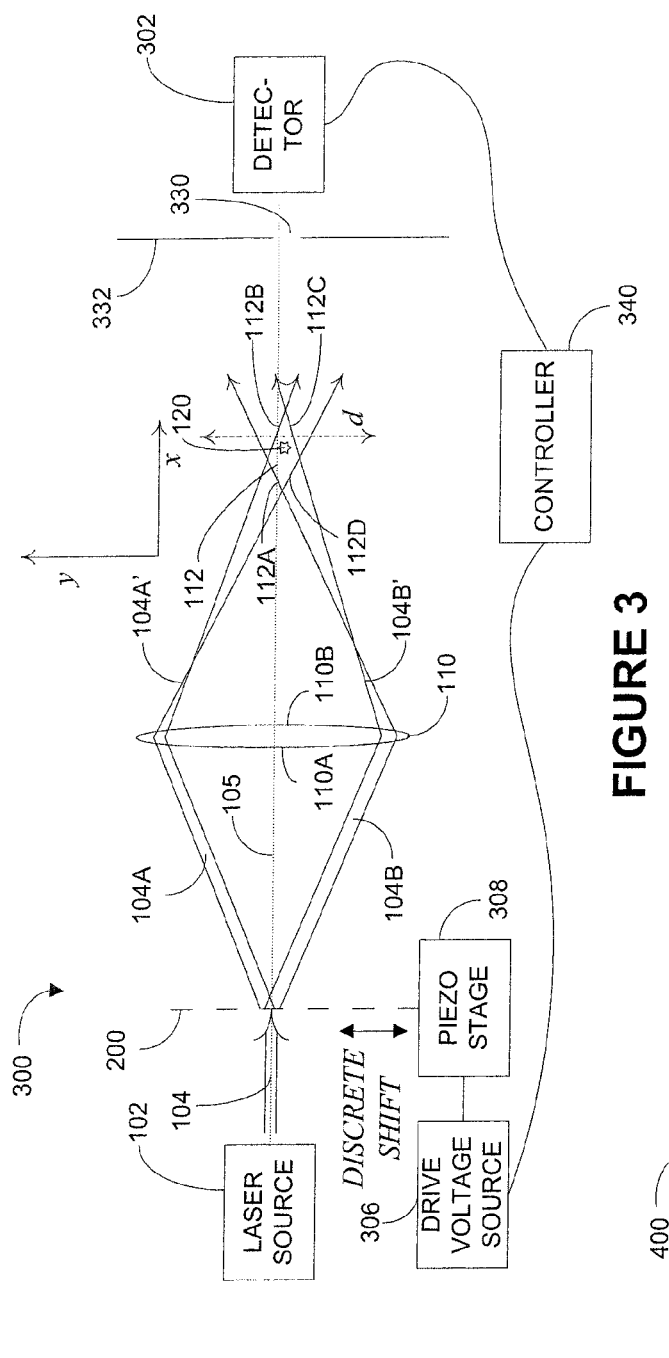
FIG. 3 is a diagram of an LDV system including the electronically switchable grating, in accordance with an embodiment of the present invention.
Figure 4:
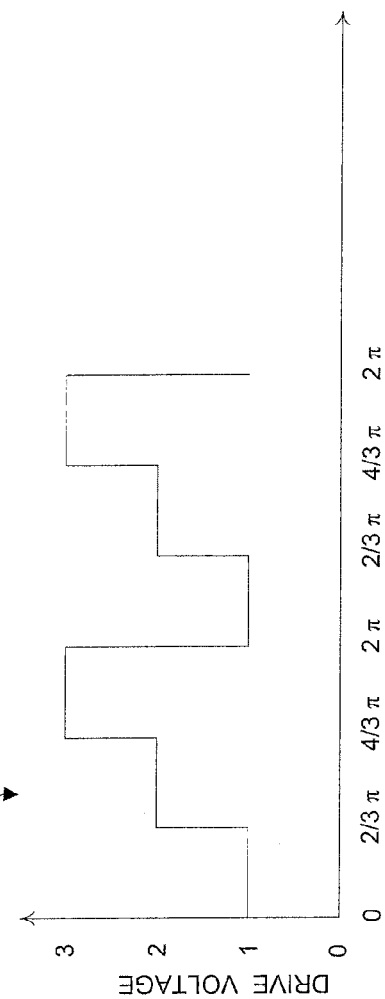
FIG. 4 is a graph of the drive voltage for a piezoelectric translation stage, in accordance with an embodiment of the present invention.

FIG. 2 is a diagram of an electronically switchable grating 200, in accordance with an embodiment of the present invention. The electronically switchable grating 200 includes a mechanical diffraction grating 200 which can be discretely positioned or switched under electronic control of a piezoelectric stage 308. FIG. 3 is a diagram of an LDV system 300 including the electronically switchable grating 200, in accordance with an embodiment of the present invention. FIG. 4 is a graph 400 of the drive voltage for a piezoelectric translation stage 308, in accordance with an embodiment of the present invention.

The electronically switchable grating 200 is shown in three phase steps in even intervals of $2\pi/3$ radians. The electronically switchable grating 200 can be an amplitude grating mounted on a piezoelectric translation stage 308 that is driven by a drive voltage source 306. The drive voltage can be stepped through the discrete steps as shown in the graph 400 of FIG. 4. Stepping the drive voltage through the discrete steps at $2\pi/3$ radians intervals causes the piezoelectric translation stage to move the electronically switchable grating 200 in the corresponding discrete steps. The piezoelectric translation stage 308 can accurately step the switchable grating 200 to three discrete positions 202, 204 and 206 (i.e., $0\pi$, $2/3\pi$, and $4/3\pi$, respectively).

While three discrete positions are described herein, it should be understood that more than three discrete positions could also be used. By way of example the, the electronically switchable grating 200 could be shifted between four positions ($0\pi$, $1/2\pi$, $1\pi$, and $3/2\pi$, respectively) or five positions ($0\pi$, $2/5\pi$, $4/5\pi$, $6/5\pi$, and $8/5\pi$, respectively) or six positions ($0\pi$, $1/3\pi$, $2/3\pi$, $1\pi$, $4/3\pi$ and $5/3\pi$, respectively) or even more positions.

While a piezoelectric translation stage 308 is used, the frequency limitations of such devices (typically up to about 500 Hz for the fastest that are commercially available) can limit the use of the piezoelectric translation stage to only relatively slower particle flow rates. As will be described below, alternative embodiments allow the switchable grating 200 to be used in a selected number of discrete positions at much higher frequencies.

Figure 5:
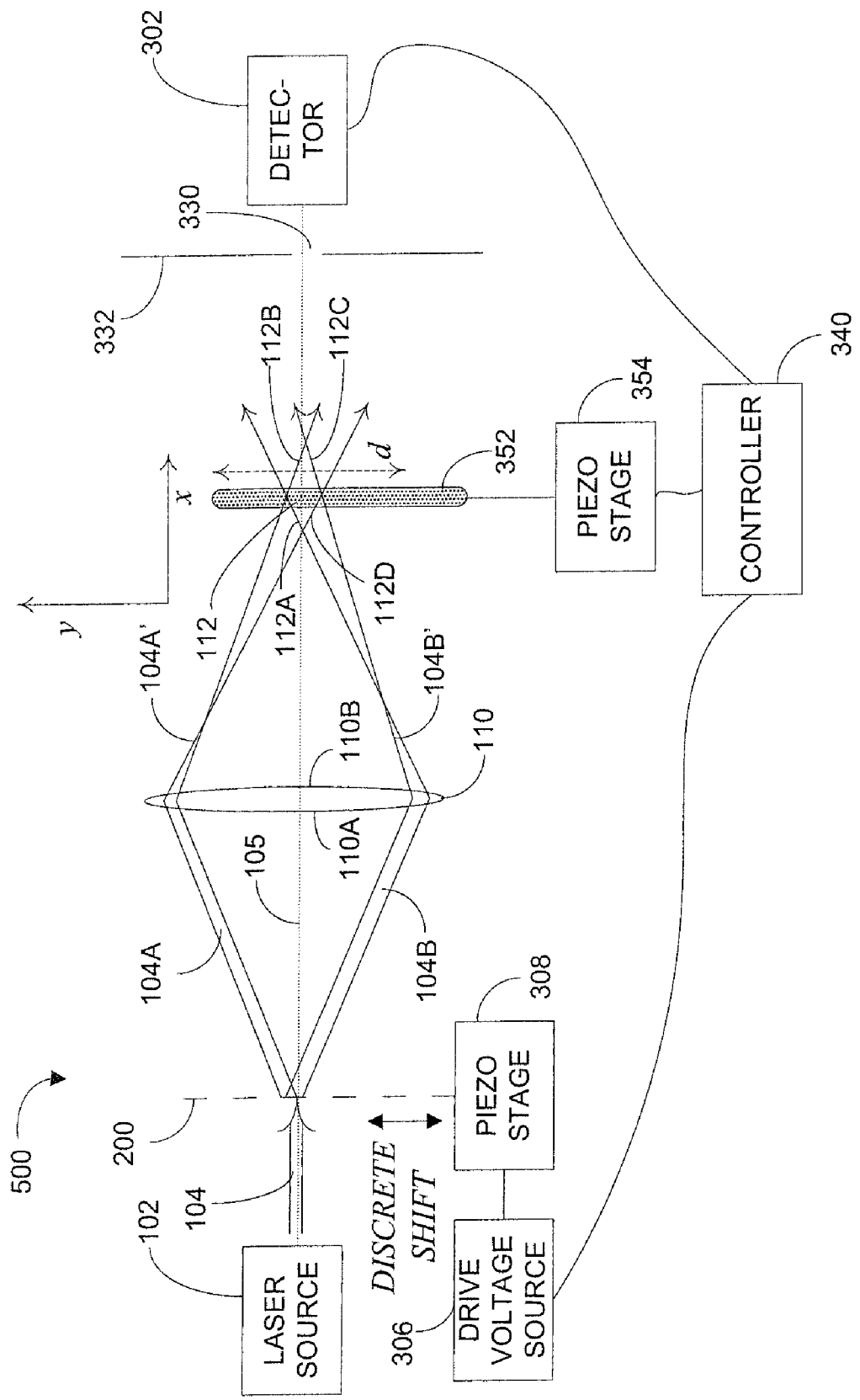
FIG. 5 is a diagram of an LDV system including the electronically switchable grating and a movable screen, in accordance with an embodiment of the present invention.

FIG. 5 is a diagram of an LDV system 500 including the electronically switchable grating 200 and a movable screen 352, in accordance with an embodiment of the present invention. Referring to both FIGS. 3 and 5, the laser source 102 can be a low power HeNe laser ($\lambda$=633 nm) is incident on a 40 lp/mm Ronchi grating (25 μm pitch). The +/−first order laser beams 104A and 104B are selected. As shown in FIG. 5, the focused +/−first order laser beams 104A' and 104B' cross on a ground glass screen 352 with a grating magnification of approximately 1. The movable ground glass screen 352 simulates a moving particle in the measurement volume 112. The ground glass screen 352 can be made by grinding the surface of a piece of glass with grit to make an optically rough surface.

Forward scattered light from the screen 352 is collected and imaged through an opening 330 in a screen 332 and detected with the detector 102. The opening 330 can have a diameter of roughly the size of one coherence area to maximize signal contrast. The optical intensity fluctuations can be recorded and Fourier transformed using a digital oscilloscope.

In one embodiment, the grating 200 is mounted on a Polytec PI P733.2CL piezo stage and the stage driven with a Polytec PI E503 LVPZT amplifier (i.e., available from Polytec in Tustin, Calif. The frequency response of this system can be limited to several hundred hertz.

Recall that the fringes 112A-D are formed using the +/−1 orders of the grating 200, therefore a shift of half the period of the grating is needed to translate the fringes by one period, which is 12.5 μm in one embodiment. As described above, the translations of 0, $1/3$ and $2/3$ of the fringe period are used, so the positions of the diffraction grating should be 0 μm, 4.2 μm and 8.3 μm.

A function generator (e.g., Agilent 33120A available from Agilent in Palo Alto, Calif.) or similar drive voltage source can be used as the drive voltage source 306 to supply the correct drive voltages to the PZT amplifier which then drove the piezo stage 308.

When driven at low frequencies (e.g., less than about 50 Hz) the required positions could be achieved to +/−0.1 μm. At higher frequencies (greater than about 50 Hz) the piezo stage 308 can experience ringing and overshoot.

FIGS. 6A through 6E are graphical representations power spectra of light intensity fluctuations 610, 620, 630, 640 and 650 of an actual test of the performance of the LDV system 500, in accordance with one or more embodiments of the present invention.

The power spectra 614, 624, 634, 644 and 654 are the raw test data. The power spectra 614, 624, 634, 644 and 654 are superimposed on respective summary curves 612, 622, 632, 642 and 652. The summary assumes only one particle in the measurement volume 112 and specifically neglects the finite extent of the fringe pattern. The intensity of the scattered light as a function of time can be written as shown in Formula 1.

$$I(t) = I_o\left[1 + \cos\left[\frac{2\pi vt}{\Lambda} + \frac{2\pi}{3}\text{floor}\left(\frac{2\pi f_0 t}{2\pi/3}\right)\right]\right] \quad \text{Formula 1}$$

where $I_0$ is a constant representing the maximum intensity of the light, v is the component of the particle velocity across the fringe pattern, $\Lambda$ is the fringe period which is the separation between the bright or dark fringes and $f_0$ is the drive frequency of the grating 200. The operator floor rounds its argument to the nearest integer in the direction of negative infinity.

FIG. 6A shows the power spectrum 610 when the grating 200 is not moving and the target (i.e., the ground glass screen 352) is driven forward by piezo stage 308 at 5 Hz. A spectral peak 612A occurs at 5 Hz to indicate the movement of the screen 352.

FIG. 6B shows the power spectrum 620 and the screen 352 is driven backwards by drive stage 308. The spectral peak 622A occurs at 7 Hz. The difference in location of peak 612A and peak 622A (i.e., 5 Hz v. 7 Hz) is due to variations in the rate at which the piezo stage 308 moves in forward and reverse directions. Specifically, the piezo stage 308 moves slightly faster in the reverse direction than in the forward direction, but there is no way to determine a priori the direction of the travel of the screen 352 in forward or reverse direction only that the screen is moving to produce peaks 612A, 622A at either 5 Hz or 7 Hz, respectively.

FIG. 6C shows the power spectrum data 630 f where the screen 352 is stationary and the grating 200 is oscillated at 20 Hz. As a result, a distinct peak 632A at 20 Hz is detected. Due to the quantized nature of the grating position, a significant harmonic peak 632B also occurs at 40 Hz.

FIG. 6D shows the power spectrum data 640 where the screen 352 is driven forward at 5 Hz and the grating 200 is oscillated at 20 Hz. The predominant peak 642A is at 25 Hz. 25 Hz is the sum of the frequency due to the motion of the screen 352 (5 Hz) and the frequency due to the oscillating grating 200 (20 Hz). The occurrence of the peak 642 at the 25 Hz sum of the two frequencies indicates that the screen 352 is driven forward at 5 Hz.

Peak 642A stands about 10 dB above the next highest peak 642B at 35 Hz (a difference frequency of 2*20 Hz minus 5 Hz). Lower intensity peaks 646A, 646B and 646C are also harmonic peaks at 5 Hz (the frequency of the screen 352 motion), 15 Hz (a difference frequency 20 Hz-5 Hz) and 45 Hz (a multiple of the two harmonics of the two frequencies).

Figure 6E:
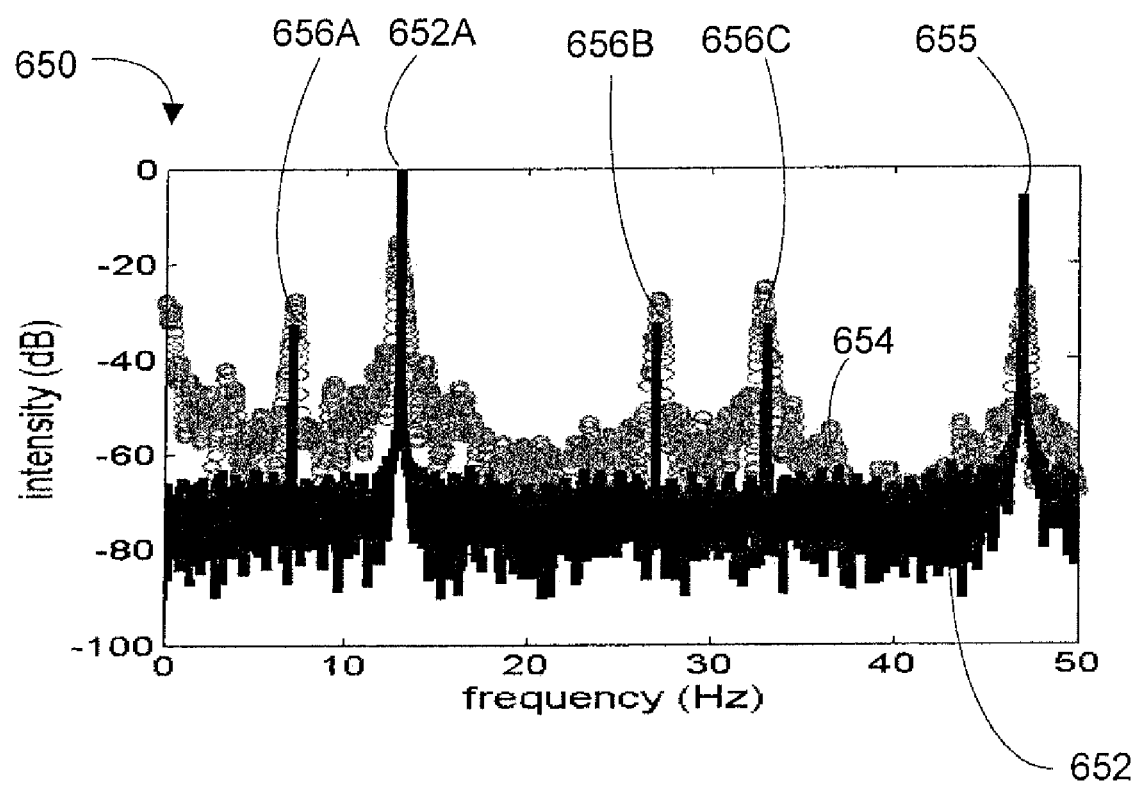

FIG. 6E shows the power spectrum data 650 where the screen 352 is driven in reverse at 7 Hz and the grating 200 is oscillating at 20 Hz. The resulting largest peak 652A occurs at 13 Hz which is 7 Hz less than 20 Hz grating frequency. The 13 Hz peak indicates that the screen 352 is driven in reverse at 7 Hz.

Peak 652A stands about 10 dB above the next highest peak 655 at 47 Hz (a sum frequency of 2*20 Hz plus 7 Hz). Lower intensity peaks 656A, 656B and 656C are also harmonic peaks at 7 Hz (the frequency of the screen 352 motion), 27 Hz (a sum frequency 20 Hz+7 Hz) and 33 Hz (a difference frequency of 2*20 Hz minus 7 Hz).

Due to the strong harmonics introduced by the discrete nature of the phase stepping, there are many additional spectral peaks 642B, 646A, 646B, 646C, 655, 656A, 656B and 656C in the detected spectra 640 and 650, respectively. As long as the additional spectral peaks 642B, 646A, 646B, 646C, 655, 656A, 656B and 656C are well separated from the dominant signal peaks 642A, 652A, respectively, the dominant signal peaks 642A, 652A can be easily detected to determine valid velocity and direction measurements.

As shown in the above FIGS. 2-6E the electronically switchable grating 200 can be used to remove the velocity ambiguity in a laser Doppler velocimeter. The electronically switchable grating 200 can be stepped discretely in precise phase.

Figure 7:
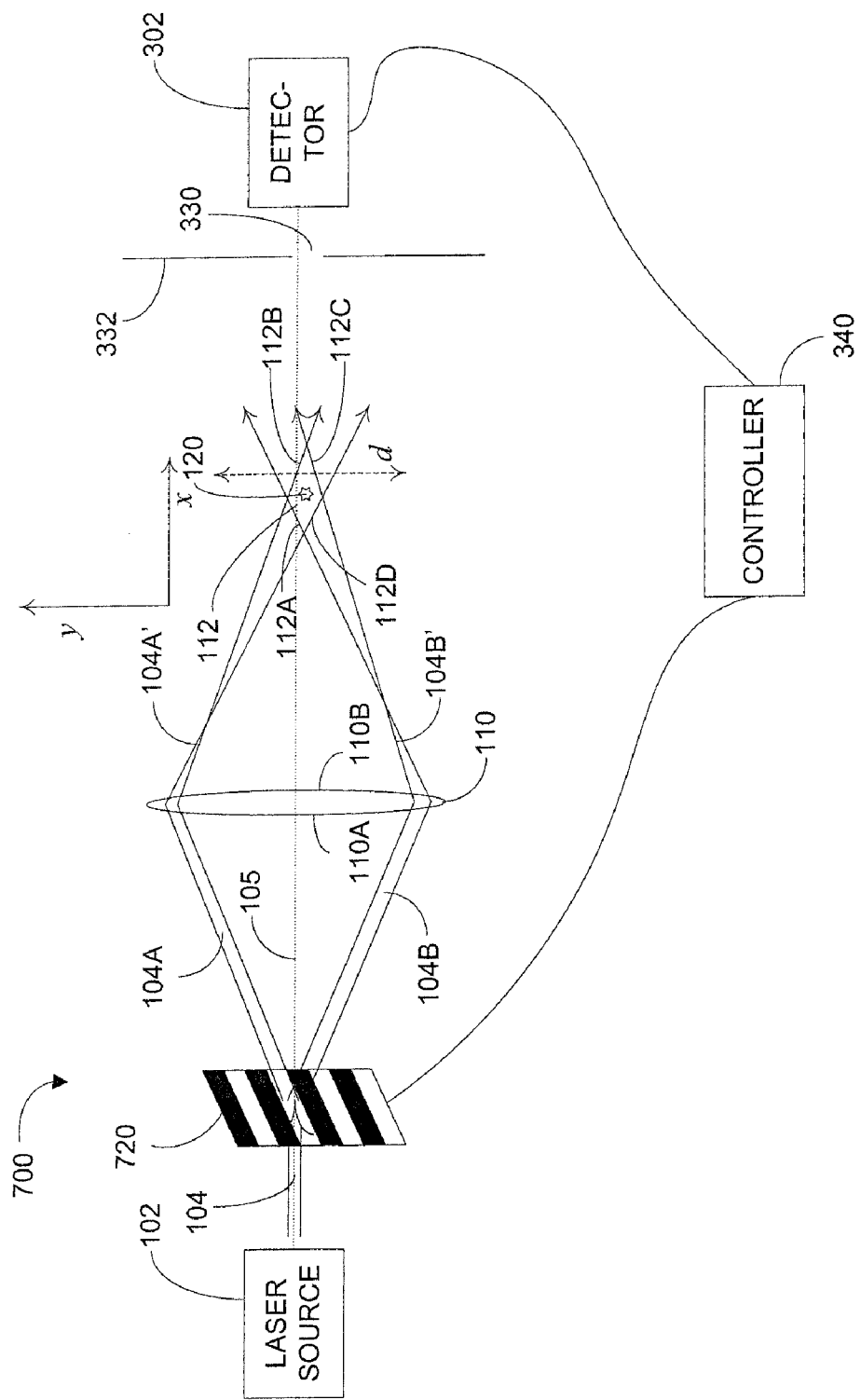
FIG. 7 is a diagram of an LDV system including a non-mechanical, electronically switchable grating, in accordance with an embodiment of the present invention.

FIG. 7 is a diagram of an LDV system 700 including the electronically switchable grating 720, in accordance with an embodiment of the present invention. As described in FIGS. 2-6E above, the mechanical electrically switchable grating 200 was mechanically switchable using a device such as a piezo stage 308 that can accurately move the grating 200 into several selected discrete positions. However, this mechanical switchable grating 200 is still limited in switching speed due to the mass of the grating itself. One embodiment of the present invention replaces the mechanical electrically switchable grating 200 a non-mechanical or much faster electronically switchable grating 720.

The non-mechanical or much faster electronically switchable grating 720 is formed from any device that can accurately interfere with or otherwise modulate the passage of the laser light 104 with a known periodic or quasi-periodic pattern of the phase and/or amplitude modulation of the laser beam 104. There are several high-speed technologies that suggest themselves for implementation of this LDV system 700. By way of example, the non-mechanical electronically switchable grating 720 can be manufactured from a liquid crystal display (LCD). In another example, the non-mechanical electronically switchable grating 720 can be manufactured from micro-electrical mechanical systems (MEMS). An LCD can have sub-microsecond switching speeds. The MEMS (e.g., as used in the digital micro-mirror (DMD) display devices by Texas Instruments) have switching times in the tens of microseconds.

The non-mechanical, or much faster electronically switchable grating 720 can achieve frequency ranges of less than one Hertz to more than 100 MHz and frequency offsets on the order of about one Hertz to more than about 100 MHz. One benefit of implementing this technique with a electronically switchable grating 720 is that the frequency shift is only determined by the timing of the drive electronics which can be performed easily and accurately. Further, eliminating or minimizing the mechanical portion of the LDV allows the LDV system 700 to be much smaller than previous LDV systems. In the case of compact LDV probes the LDV system 700 would also be advantageous since an electric motor would not have to be accommodated within the compact LDV probe head.

The electronically switchable grating 720 can be an LCD or DMD that can display portions 720A that interfere with the light 104 and portions 720B that minimally interferes with the light similar to the grating 200 shown in FIG. 2 above. As the electronically switchable grating 720 is an electronically controlled display or an image displayed on an electronic display, the controller 340 can cause the display to switch through the different discrete images. Each of the discrete images is analogous to the discrete positions of the grating 200 described in FIGS. 2-6E above.

Figure 8:
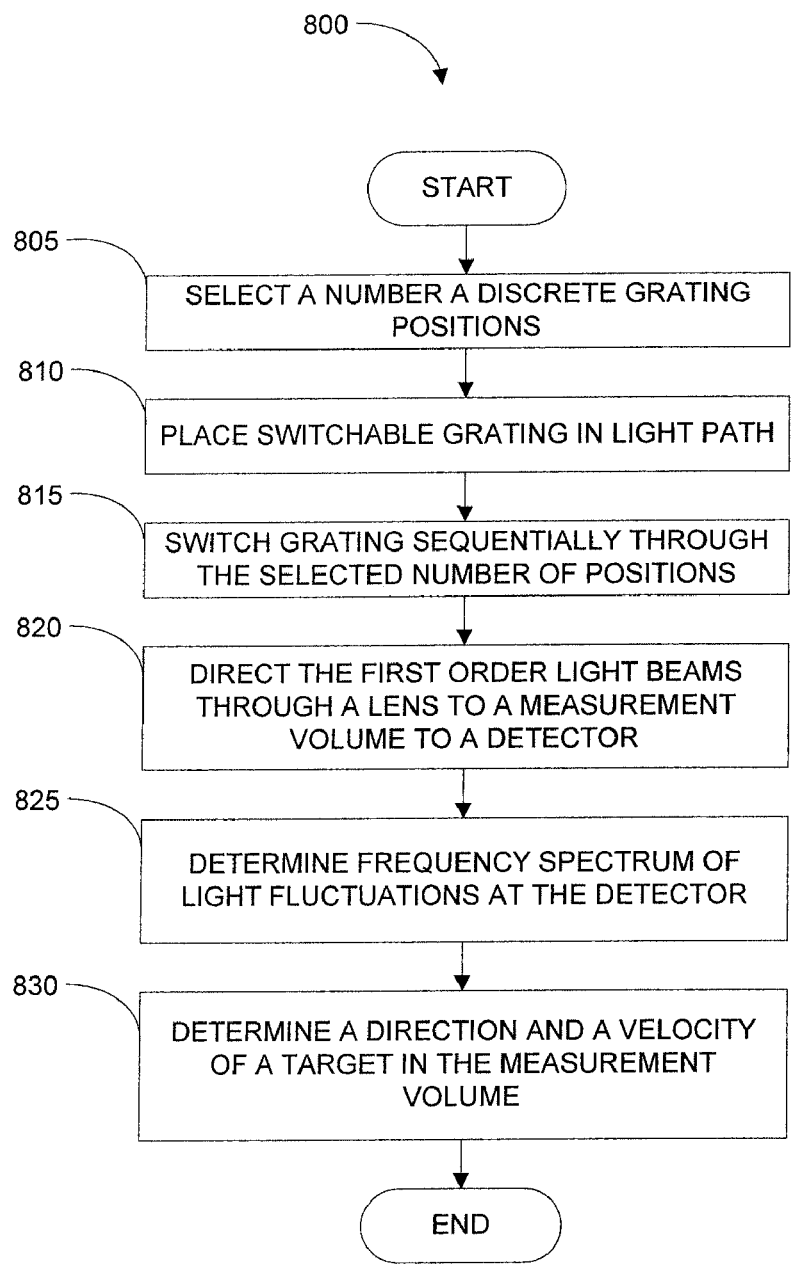
FIG. 8 is a flowchart diagram that illustrates the method operations performed in measuring the direction and velocity of a target in a measurement volume in the LDV system, in accordance with one embodiment of the present invention.

FIG. 8 is a flowchart diagram that illustrates the method operations performed in measuring the direction and velocity of a target in a measurement volume 112 in the LDV systems 300, 500 and 700, in accordance with one embodiment of the present invention. In an operation 805, a number a discrete grating positions or images is selected. The electronically switchable grating 720 or image thereof can switch through three phase images in even intervals of $2\pi/3$ radians. Alternatively, the electronically switchable grating 720 or image thereof can switch through more than three discrete phase images. By way of example the, the electronically switchable grating 720 could be displayed between four positions ($0\pi$, $\frac{1}{2}\pi$, $1\pi$, and $\frac{3}{2}\pi$, respectively) or five positions ($0\pi$, $\frac{2}{5}\pi$, $\frac{4}{5}\pi$, $\frac{6}{5}\pi$, and $\frac{8}{5}\pi$, respectively) or six positions ($0\pi$, $\frac{1}{3}\pi$, $\frac{2}{3}\pi$, $1\pi$, $\frac{4}{3}\pi$ and $\frac{5}{3}\pi$, respectively) or even more phase images.

In an operation 810, the switchable grating 720 is placed in the light path 104. The grating 720 is switched or displayed sequentially through the selected number of phase images in an operation 815.

In an operation 820, the first order light beams 104A, 104B are directed through the lens 110 to a measurement volume 112 and to a detector 302. In an operation 825, the frequency spectrum of the light fluctuations at the detector are determined. Light scattered from the particle 120 in the measurement volume 112 is received in the detector 302.

In an operation 830, the controller 340 can determine a direction and a velocity of a target (e.g., the particle 120) in the measurement volume 112 by calculating the power spectrum of the scattered light fluctuations (e.g., as shown in FIG. 6A-6E).

In an alternate embodiment, the controller can determine the direction and velocity of the target by processing the signal received from the detector by other methods. By way of example, the signal received from the detector can be processed by calculating an autocorrelation or by use of other transforms such as wavelet transforms.

Figure 9:
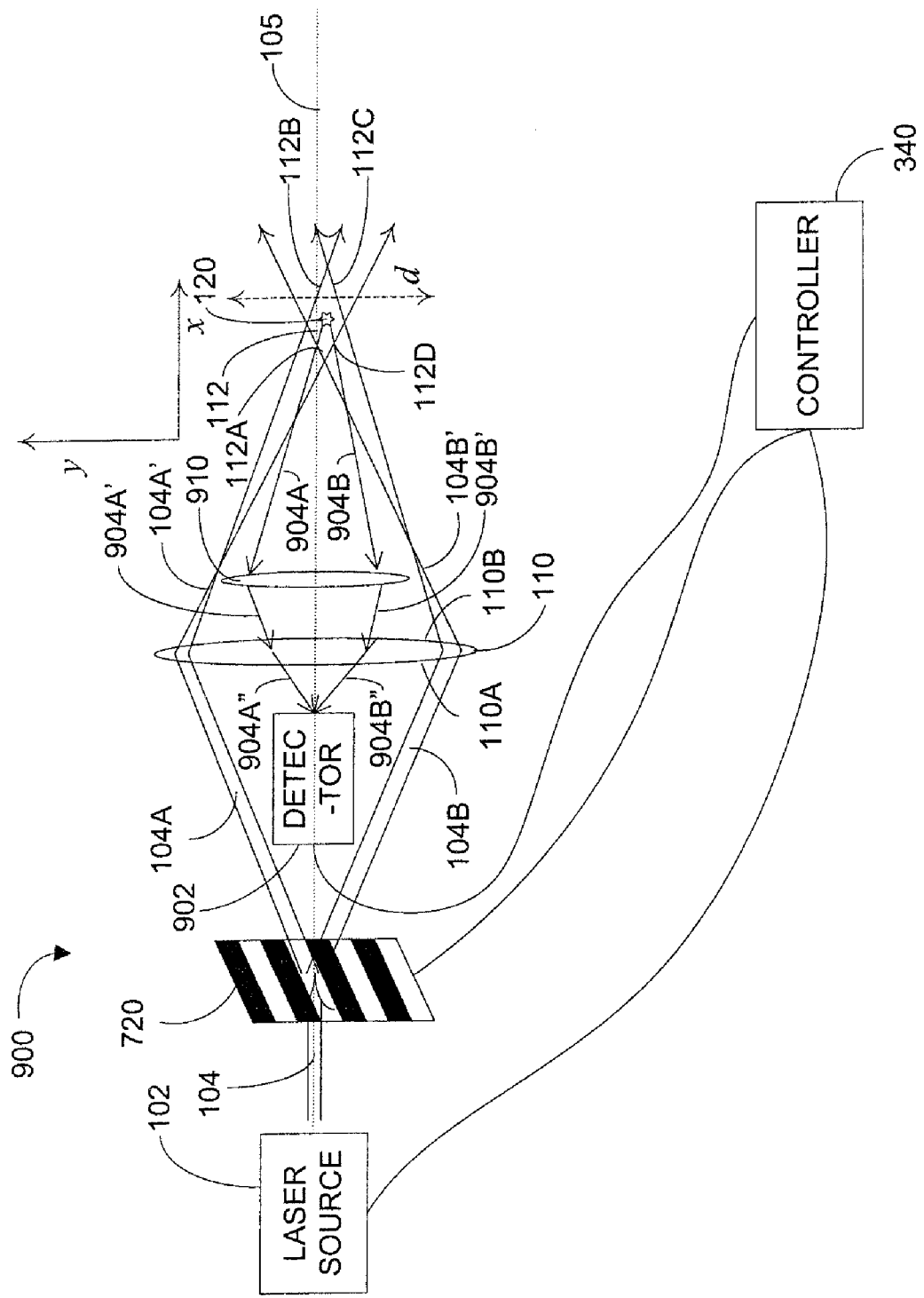
FIG. 9 is a diagram of an LDV system including the electronically switchable grating, in accordance with an embodiment of the present invention.

FIG. 9 is a diagram of an LDV system 900 including the electronically switchable grating 720, in accordance with an embodiment of the present invention. The LDV system 900 is a more physically compact than the LDV system 700 described above because the detector 902 is located between the lens 110 and the non-mechanical, electronically switchable grating 720.

In operation the LDV system 900 operates substantially similar to the LDV systems described above in other embodiments of the invention except that the signals 904A and 904B reflected from the particle 120 and back toward the lens 110. The signals 904A and 904B pass through a secondary lens 910 that focuses the signals 904A' and 904B' to lens 110 which then focuses the signals 904A" and 904B" into the detector 902.

Figure 10:
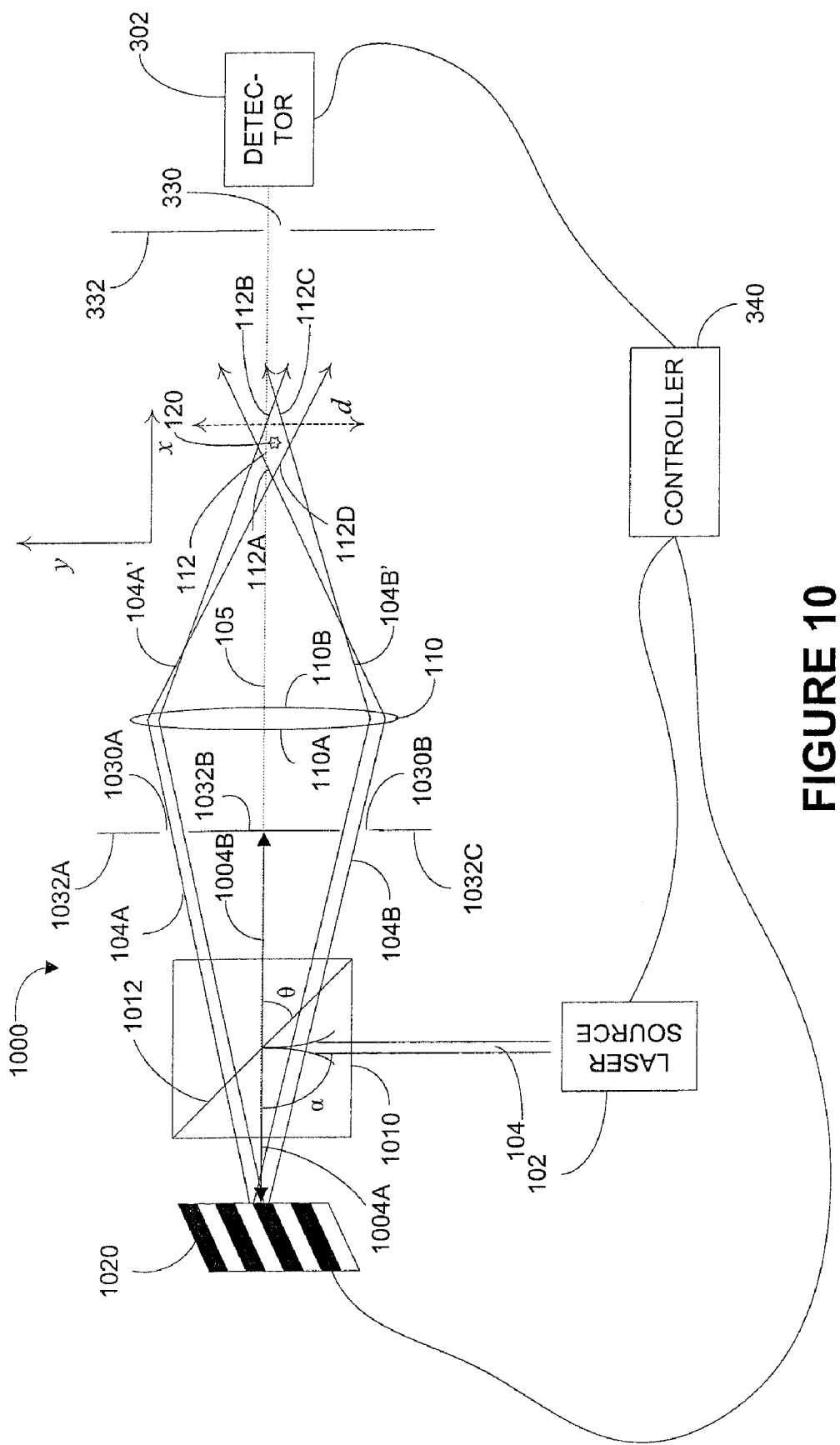
FIG. 10 is a diagram of an LDV system including an electronically switchable reflective grating and a reflector, in accordance with an embodiment of the present invention.

FIG. 10 is a diagram of an LDV system 1000 including an electronically switchable reflective grating 1020 and a reflector 1012, in accordance with an embodiment of the present invention. The reflector 1012 provides a reflective surface placed at an angle θ relative to light path 105. Angle θ can be any suitable angle in a range from less than one degree to more than 179 degrees so as to allow the laser beam 104 to be offset to one side of the light path 105 at an angle α relative to the light path 105. The angle α can be any suitable angle in a range from less than one degree to more than 179 degrees.

Offsetting the source 102 allows the LDV system 1000 to be more physically compact. The reflector 1012 can also be combined with relocating the detector 902 as shown in FIG. 9 to further physically package the LDV systems 900 and 1000 as may be desired.

The reflective grating 1020 operates by diffracting and reflecting the light emitted from the reflector 1012. The diffracted light beams 104A, 104B are then used as described above.

The laser source 102 emits a laser beam 104 toward the reflector 1012. The reflector 1012 can be a solid reflective surface (i.e., a mirror) or alternatively, a reflective surface that reflects at least a portion of the laser beam 104 toward the grating 1020. As described above, the grating 1020 reflects and diffracts the light 1004A and the reflected and diffracted light beams 104A, 104B pass through openings 1030A and 1030B, respectively, to the lens 110. The screen 1032A, 1032B, 1032C substantially prevents undesired light beams 1004B from impinging the lens 110.

While the above embodiments have been described in terms of laser light, it should be understood that other types of light, visible and beyond the visible spectrum and other electromagnetic signals in other frequencies of the electromagnetic spectrum.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code and/or logic. The computer readable medium is any data storage device that can store data which can thereafter be read by a computer system. Examples of the computer readable medium include hard drives, network attached storage (NAS), logic circuits, read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in the above figures are not required to be performed in the order illustrated, and that all the processing represented by the operations may not be necessary to practice the invention. Further, the processes described in any of the above figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for measuring the direction and velocity of a target in a measurement volume in a laser Doppler velocimetry system comprising:
    selecting a discrete number of grating positions for an electrically switchable grating;
    placing the electrically switchable grating in a light path of a laser source, wherein the laser source outputs a laser beam along the light path;
    switching the electrically switchable grating sequentially through the discrete number of grating positions at a grating frequency to generate diffracted light beams from the laser;
    directing the diffracted light beams through a lens;
    focusing the diffracted light beams on a measurement volume;
    passing a target through the measurement volume in a target direction at a target velocity; and
    receiving scattered light in a detector and calculating the power spectrum of light intensity fluctuations, wherein the power spectrum includes a maximum peak, wherein the maximum peak occurs at a frequency shifted from the grating frequency an amount corresponding to the target velocity and in a direction corresponding to the target direction.

2. The method of claim 1, wherein the discrete number of grating positions includes three positions.

3. The method of claim 1, wherein the discrete number of grating positions includes more than three positions.

4. The method of claim 1, wherein the discrete number of grating positions are equally spaced along a 2π radian cycle.

5. The method of claim 1, wherein the discrete number of grating positions are electronically displayed images.

6. The method of claim 5, wherein the electrically switchable grating is an electronic image displayed on an electronic display and wherein the discrete number of grating positions include a discrete number of electronic grating images.

7. The method of claim 6, wherein the electronic display is a liquid crystal display.

8. The method of claim 6, wherein the electronic display is a digital micro-mirror display.

9. The method of claim 1, wherein the maximum peak in the power spectrum occurs at a frequency less than the grating frequency if the target is moving in a reverse direction.

10. The method of claim 1, wherein the maximum peak in the power spectrum occurs at a frequency greater than the grating frequency if the target is moving in a forward direction.

11. The method of claim 1, wherein the grating frequency is between less than one Hertz and more than about 100 MHz.

12. The method of claim 1, wherein the target includes at least one of a fluid flow and a surface and wherein the target is moving relative to the measurement volume.

13. A laser Doppler velocimetry system for measuring the direction and velocity of a target in a measurement volume comprising:
- a lens;
- a laser source, wherein the laser source outputs a laser beam along a light path, wherein the light path is directed toward the lens;
- an electrically switchable grating having a discrete number of grating positions wherein the electrically switchable grating is in the light path between the laser source and the lens;
- a moving target passing through a measurement volume in a target direction and at a target velocity, wherein the lens focuses a pair of diffracted light beams from the electrically switchable grating into the measurement volume;
- a detector directed along the light path, wherein the detector is on an opposite side of the lens from the laser source; and
- a controller coupled to the electrically switchable grating and the detector, wherein the controller includes circuitry for determining a maximum peak in a power spectrum of a signal received in the detector, wherein the maximum peak occurs at a frequency shifted from the grating frequency an amount corresponding to the target velocity and in a direction corresponding to the target direction.

14. The system of claim 13, wherein the discrete number of grating positions includes three positions.

15. The system of claim 13, wherein the discrete number of grating positions includes more than three positions.

16. The system of claim 13, wherein the discrete number of grating positions are equally spaced along a $2\pi$ radian cycle.

17. The system of claim 13, wherein the electrically switchable grating is an electronic image displayed on an electronic display and wherein the discrete number of grating positions include a discrete number of electronic grating images.

18. The system of claim 17, wherein the electronic display is a liquid crystal display.

19. The system of claim 17, wherein the electronic display is a digital micro-mirror display.

20. The system of claim 13, wherein the maximum peak occurs at a frequency less than the grating frequency if the target is moving in a reverse direction.

21. The system of claim 13, wherein the maximum peak occurs at a frequency greater than the grating frequency if the target is moving in a forward direction.

* * * * *